United States Patent [19]

Bocko et al.

[11] Patent Number: 5,597,395
[45] Date of Patent: Jan. 28, 1997

[54] METHOD FOR LOW TEMPERATURE PRECOMPACTION OF GLASS

[75] Inventors: Peter L. Bocko, Painted Post; Josef C. Lapp, Corning; John W. Nelson; Carolyn K. Schad, both of Painted Post, all of N.Y.

[73] Assignee: Corning Incorporated, Corning, N.Y.

[21] Appl. No.: 563,878

[22] Filed: Nov. 28, 1995

[51] Int. Cl.[6] .................................................. C03B 32/00
[52] U.S. Cl. ............................... 65/33.4; 65/60.8; 65/111
[58] Field of Search ................................. 65/33.1, 33.4, 65/60.8, 102, 104, 106, 273, 111

[56] References Cited

U.S. PATENT DOCUMENTS

| | | | |
|---|---|---|---|
| 4,286,052 | 8/1981 | Ernsberger | 430/330 |
| 4,295,872 | 10/1981 | Luers | 65/30.11 |
| 4,302,235 | 11/1981 | Luers | 65/30.11 |
| 4,414,014 | 11/1983 | Bruning et al. | 65/31 |
| 5,294,238 | 3/1994 | Fukada et al. | 65/60.2 |

Primary Examiner—Donald E. Czaja
Assistant Examiner—Sean Vincent
Attorney, Agent, or Firm—Robert L. Carlson

[57] ABSTRACT

A method for precompacting glass sheets for use in flat panel displays, particularly those which utilize polycrystalline silicon. The glass is exposed to a temperature and pressure and for a period of time sufficient to precompact the glass sheet an amount necessary to make the glass sheet suitable for use in a flat panel display which uses polysilicon.

13 Claims, 3 Drawing Sheets

METHOD FOR LOW TEMPERATURE PRECOMPACTION OF GLASS

RELATED APPLICATIONS

This application claims the benefit of the priority date of U.S. Provisional patent application Ser. No. 60/004,911, filed Oct. 6, 1995.

FIELD OF THE INVENTION

The invention relates to a method and apparatus for precompacting glass, particularly glass sheets for use in flat panel display applications.

BACKGROUND OF THE INVENTION

Liquid crystal displays (LCDs) are typically comprised of two flat glass sheets that encapsulate a thin layer of liquid crystal material. An array of transparent thin-film electrodes on the glass modulate the light transmission properties of the liquid crystal material, thereby creating the image. By incorporating an active device such as a diode or thin film transistor (TFT) at each pixel, high contrast and response speed can be achieved to produce high resolution displays. Such flat panel displays, commonly referred to as active matrix LCDs (AMLCD), have become the predominant technology for high performance displays such as notebook computer and portable televisions.

At present, most AMLCDs utilize amorphous silicon (a-Si) TFTs. The fabrication process for a-Si typically consists of successive deposition and patterning of thin films using elevated temperature processes which result in substrate heatings to temperatures in the range of 200°–450° C. Because of the high registration requirement between patterning steps for these thin films, the glass substrates often require a dimensional stability (low shrinkage) in the 5–20 parts per million (ppm) range throughout this processing. Five to twenty parts per million shrinkage means, for example, 2.5–10 microns shrinkage over a substrate length of 500 mm. When greater than 5–20 ppm shrinkage occurs, registration errors will accrue between components applied subsequently in the polysilicon TFT manufacturing process.

One approach to solving this glass shrinkage problem is to make the kinetics of the densification slow compared to the time scale of the subsequent processing steps. This can be achieved by utilizing glasses which have a high strain point. One such glass, manufactured by Corning Incorporated and known as Code 1737 glass, has the highest strain point (about 666° C.) currently commercially available for flat panel display substrates. This glass can be used in processing conditions of 1 hour at 450° C. with negligible dimensional shrinkage in the glass.

It has long been recognized that the use of polycrystalline silicon (poly-Si) would offer certain advantages over a-Si. Poly-Si has a much higher drive current and electron mobility, thereby allowing reduction of TFT size and at the same time increasing the response speed of the pixels. It is also possible, using poly-Si processing, to integrate display drive circuitry directly onto the glass. Conversely, a-Si requires discrete driver chips which are attached to the display periphery using integrated circuit packaging techniques such as tape carrier bonding.

Unfortunately, poly-Si requires higher processing temperatures than a-Si. Poly-Si is conventionally made by depositing amorphous silicon onto a glass sheet using chemical vapor deposition (CVD) techniques, and subsequently exposing the coated glass to high temperatures for a sufficient period of time to crystallize the a-Si to poly-Si. This crystallization step is typically done at about 600° C. for several tens of hours. Alternatively, rapid thermal annealing or laser crystallization can be employed, wherein a laser or other sharp temperature gradient is used to minimize heating of the glass substrate. In either case, the substrate experiences 400°–600° C. processing temperatures during the poly-Si crystallization process. In addition, there are commonly several other high temperature (600° C.) processes following the crystallization step. Such process steps include deposition of the gate oxide, annealing of the gate oxide, and source/drain annealing.

The relatively high temperatures of the crystallization and subsequent processing steps encountered during poly-Si TFT manufacturing greatly increases the potential for glass substrate shrinkage.

One approach to solving this severe glass shrinkage problem is to anneal the glass before subjecting the glass to the AMLCD processing conditions. This serves to predensify the glass, making the subsequent compaction less. However, standard annealing processes require relatively longer times at higher temperatures. These long annealing times make processing extremely difficult and costly. In addition, at these higher temperatures, the glass has a lower viscosity. As a result, the glass substrate may incur sheet warp, sheet sag, or surface defects and imperfections during the annealing process.

It would therefore be desirable to develop a process to precompact an existing commercial glass substrate (such as Corning Incorporated code 1737 glass) and thereby enable the glass to meet the 5–20 ppm shrinkage level, even after exposure to poly-Si processing temperatures. Preferably, such a process should ideally avoid the need for both the high temperatures and long times utilized in conventional annealing operations.

SUMMARY OF THE INVENTION

The present invention relates to a method for precompacting glass substrates, wherein the glass is subjected to sufficient omnidirectional pressure at a temperature which is sufficient to adequately precompact the glass with minimal damage to the glass sheet during the precompaction process. Such temperatures should correspond to a glass viscosity of about $10^{12}$ to $10^{17}$ poises, more preferably about $10^{14}$ to $10^{17}$ poises. The pressures employed preferably range from about 5000 to about 15000 psi, more preferably from about 5000 to about 10000 psi. The preferred gas for the precompaction process is argon. These temperatures and pressures are held for a period which is sufficient to result in adequate precompaction of the glass sheet to enable the glass sheet to survive subsequent processing steps without unacceptable shrinkage. Consequently, the glass is preferably held at these temperature and pressure conditions for a period of 20 minutes to three hours, more preferably a period of about 30 to 60 minutes. Subsequently, the glass is cooled to a temperature below which the compaction effect will not relax, i.e., below the strain point. The rate at which the glass is cooled to this temperature contributes to the degree to which precompaction is retained in the glass. Cooling too fast diminishes the compaction effect to some extent. Consequently, the glass is preferably cooled to a temperature below the strain point of the glass at a rate of about 1°–5° C., more preferably about 2°–3° C. per minute. More preferably, the glass is cooled to a temperature about 100° C.

below the strain point, and most preferably about 200° C. below the strain point, at a rate of about 1°–5° C., more preferably about 2°–3° C.

It has been found that methods in accordance with the invention are particularly well suited for precompacting glass sheets made using conventional glass forming techniques, e.g., fusion, float, or downdraw methods. Glass substrates treated using the methods of the present invention result in a number of advantages over prior art glass substrates. For example, using the precompacting methods discussed herein, glass sheets which were heretofore unacceptable as poly-silicon LCD substrates can now successfully be employed in such applications. These glass sheets can be treated in accordance with the present invention to result in less than 10 ppm shrinkage, during the poly-Si TFT processing, and more preferably less than 5 ppm shrinkage during such processing. Such results are achieved using temperatures and processing times which are well below what is employed in conventional annealing operations.

DETAILED DESCRIPTION OF THE INVENTION

In the present invention, glass sheets are exposed to a pressure and temperature which is sufficient to precompact them. By adequately precompacting the glass sheets, they will remain dimensionally stable during subsequent high temperature processing steps such as are used in poly-Si manufacturing operations. Thus, the process of the present invention is extremely useful for forming substrates which are useful in poly-Si TFT structures.

Figure 1:
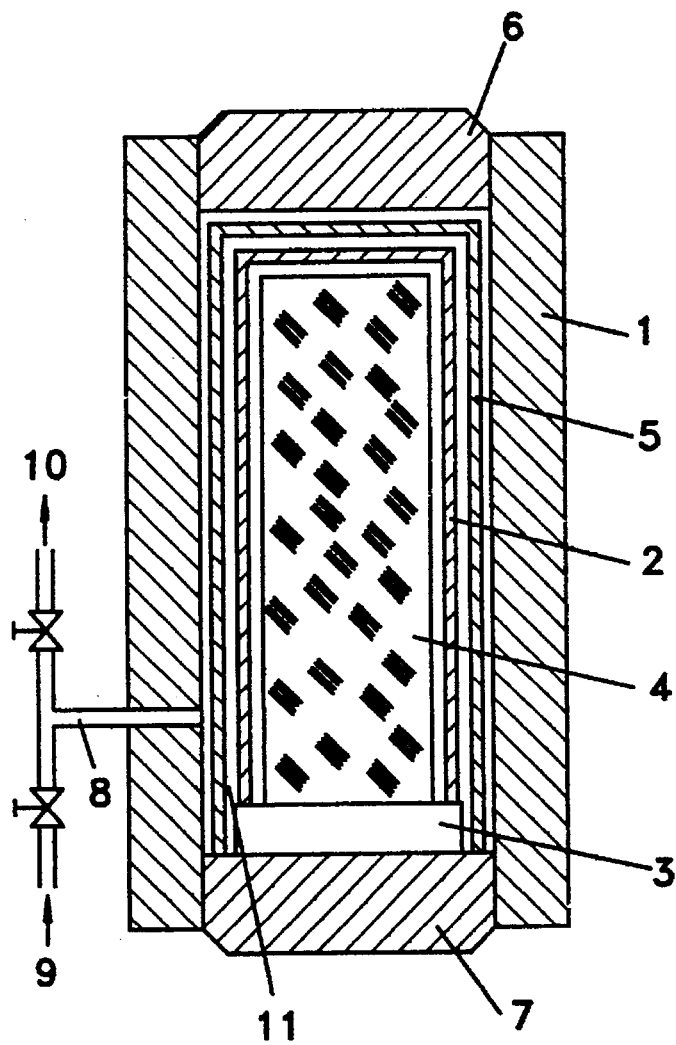
FIG. 1 illustrates an apparatus for carrying out a method in accordance with the invention.

A hot isostatic pressing unit (hipping unit) may be employed to accomplish the precompacting. Such a hipping unit is illustrated in FIG. 1, and consists of a hollow cylinder 1 which contains in its interior an electric furnace 2. Inside the furnace there is a support 3 on which the glass sheets to be treated are disposed. The furnace is surrounded by an insulating hood 5 with vents 11 which prevents the furnace cylinder and its cover from heating up. The hipping unit is charged either through the cover 6, disposed on the front, or the bottom 7. For the introduction of the treating gas there is provided a feed pipe 8 which is connected to an inlet pipe 9 and an outlet pipe 10.

For their treatment, the glass sheets 4 are placed on the support 3. The treatment preferably is carried out at a temperature which corresponds to a viscosity of about $10^{12}$ to $10^{17}$ poises, more preferably about $10^{14}$ to $10^{17}$ poises. The temperature should be high enough to improve the speed of densification of the glass, yet low enough to minimize damage to the glass sheet during the precompaction process. For this reason, a viscosity of $10^{14}$ to $10^{17}$ poises is preferred.

While being held at these temperatures, the glass is subjected to omnidirectional pressure ranging from 5000 to 15000 psi of a gas. These temperatures and pressures are held for a period which is sufficient to result in adequate compaction of the glass sheet, preferably enough so that the glass sheet can undergo subsequent poly-Si processing steps without unacceptable shrinkage. To accomplish this, the glass is typically held at these conditions for a period of 20 minutes to six hours, more preferably 20 minutes to three hours, and most preferably a period of about 30 to 60 minutes. Subsequently, the glass is cooled, at a controlled cooling rate, to a temperature below which the compaction effect will not relax, i.e., below the strain point. Preferably, the glass is cooled to about 100° C., and more preferably about 200° C. below the strain point of the glass at a controlled cooling rate. The rate of the controlled cooling contributes to the degree to which compaction is retained in the glass. Cooling too fast can diminish the compaction effect to some extent. Consequently, the glass is preferably cooled to this temperature (about 100° C.–200° C. below the strain point of the glass) at a rate of about 1°–5° C. per minute, more preferably about 2°–3° C. per minute.

One way to characterize what happens to the glass during the precompaction process is by fictive temperature. Fictive temperature is used to describe the temperature of the equilibrium structure of the glass. If a glass is heated and held at a temperature for a long enough period, the glass will eventually assume the equilibrium structure corresponding to that temperature. Conversely, if a glass is rapidly cooled from a temperature above the transition region (as it is in some glass manufacturing operations), it will retain the properties characteristic of this temperature, in which case this temperature will be the fictive temperature of that glass. During precompaction, the fictive temperature changes as a function of time during the precompacting operation until the fictive temperature of the glass sheet becomes the temperature used during the precompacting operation. If desired, high pressure can be used to achieve a fictive temperature which is lower than the precompaction hold temperature. Consequently, using the precompacting process of the present invention, glass sheets can be equilibrated to a wide variety of desired process temperatures.

To form polysilicon liquid crystal display devices in accordance with the present invention, there are several processing steps. The glass is first heat treated under pressure in accordance with the invention to precompact the glass sheet. Then amorphous silicon is applied onto the glass by chemical vapor deposition techniques. The coated glass is treated at a high enough temperature to convert the amorphous silicon to poly-Si (note that this is the second heat treatment to the glass sheet). While excessive shrinkage of the glass substrate may induce an unacceptable level of stress at the substrate-poly-Si interface, dimensional changes in the glass substrate are generally of less importance at this point in the manufacturing process, because no patterning of the metal layers which make up the TFT has yet occurred. Consequently, while in most cases it is desirable to have the glass fully treated in accordance with the invention prior to formation of poly-Si, as will be explained below, in some cases it may be sufficient to actually use the poly-Si conversion as part of the heat treatment in accordance with the invention.

Other subsequent high temperature processes include deposition of the gate oxide (typically $SiO_2$); annealing of the gate oxide; and the source/drain annealing step. In between the gate oxide annealing step and the source/drain annealing step, the gate oxide is typically patterned using conventional lithography techniques. It is after this point that dimensional changes in the glass sheets are a particular problem. Consequently, by the time the gate oxide annealing step is complete, it is extremely desirable to have the glass fully treated in accordance with the invention, in a manner which will prevent any substantial dimensional changes in the glass sheet thereafter.

The invention is further illustrated by the following examples, which are meant to be illustrative, and not in any way limiting, to the claimed invention. All of the examples employ Corning Incorporated Code 1737 glass.

EXAMPLE 1

Figure 2:
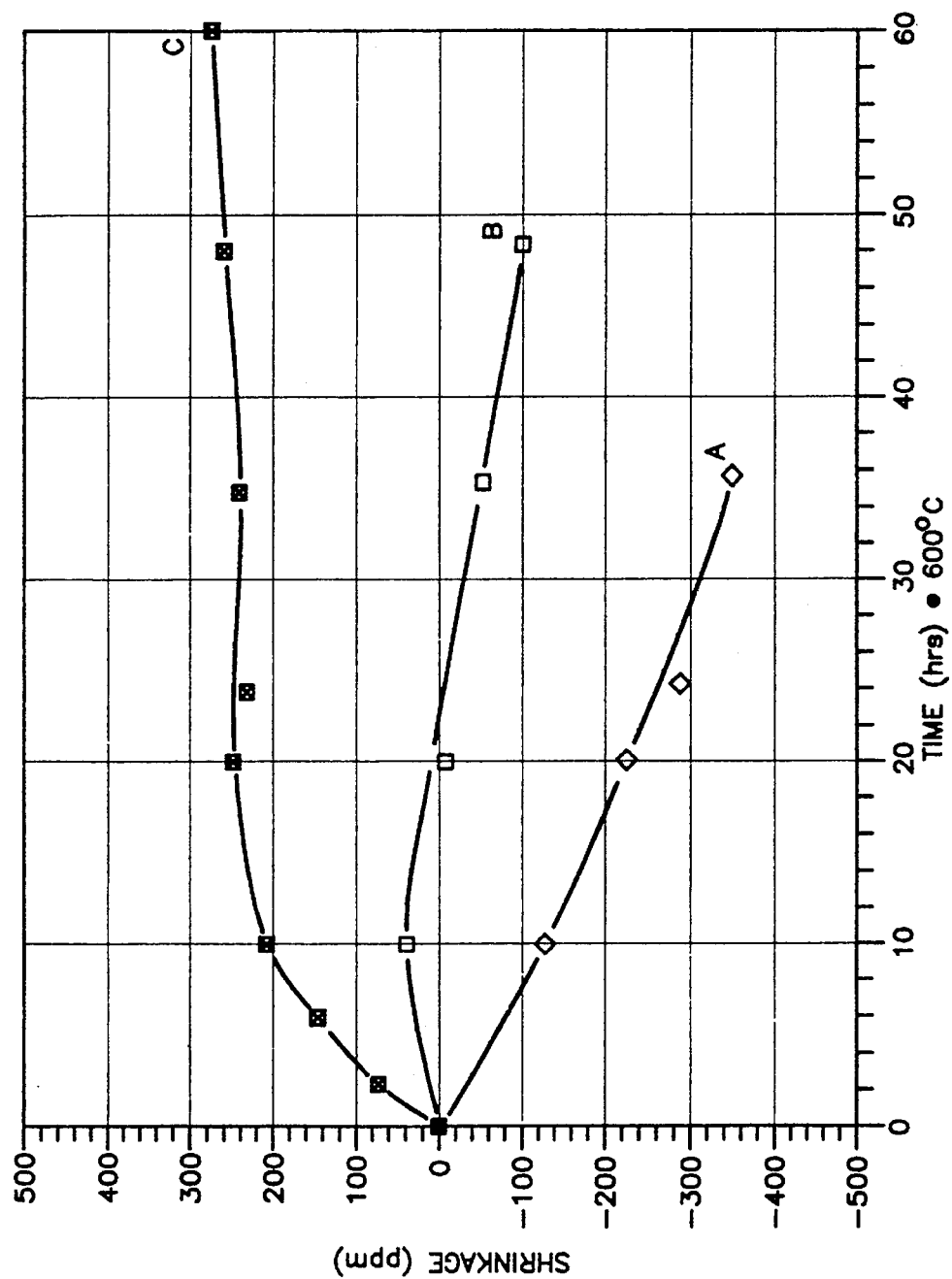
FIG. 2 is a graph of shrinkage as a function of time at 600° C. for code 1737 glass.

FIG. 2 plots shrinkage as a function of time (hrs.) at 600° C. for code 1737 glass precompacted under three different schedules. Positive values of shrinkage indicate expansion of the sample, negative values indicate contraction. The data presented by curve A was measured on as-formed glass sheets produced using the Dockerty downdraw process. As illustrated in FIG. 2, as these samples are subsequently heated at 600° C. for 10–36 hrs (simulating the crystallization step of poly-Si processing), they undergo contractions ranging from −130 to −360 ppm. The negative slope of the curve suggests that even after 34 hours at 600° C., the glass has not yet reached thermal equilibrium. Therefore, the glass would be expected to undergo even larger contractions for longer hold times, making this glass unacceptable as a poly-Si substrate.

Curves B and C represent glass samples which had previously been precompacted via hipping in accordance with the invention. The process used for hipping the glass samples in these examples was to lay approximately 12 pieces of glass one atop another on a flat fused silica glass setter. This sandwich of glass was then placed inside the graphite chamber which effectively acted as the furnace of the HIP unit. The chamber was then closed and evacuated. The temperature and pressure were then ramped up to their desired levels at about 5°–6° C. and 15–20 psi/min., respectively, held for the desired amount of time, and then ramped back down to ambient conditions at about 2°–3° C. and 10–15 psi/min., respectively.

For curve B, the hipping schedule consisted of a 100 min. hold at a peak temperature of 650° C. under 9000 psi pressure, while the curve C samples were hipped at 650° C., 15000 psi pressure for 360 minutes.

As shown in FIG. 2, the curve B glass underwent an initial expansion when subsequently heated at 600° C. for short times (0–10 hrs.). However, when heated at longer times, the glass undergoes contraction, crossing zero shrinkage at approximately 20 hours. In addition to exhibiting a zero shrinkage crossover, the slope of this curve at times in excess of 10 hrs. is less than the slope of curve A. This suggests that, even though this glass is not yet at thermal equilibrium after 48 hrs. at 600° C. (as evidenced by a nonzero slope), it is approaching it more rapidly than the glass which was not hipped. By adjusting the temperature, time, and pressure of the hipping cycle, the zero shrinkage crossover may be adjusted to various times and temperatures in this Second heat treatment step. For example, Table I below lists shrinkages for two different secondary heat treatment cycles (precompaction being the first heat treatment cycle) as a function of the precompaction conditions.

TABLE I

SHRINKAGE UNDER TWO SECONDARY HEAT CYCLES AS A FUNCTION OF HIPPING SETPOINTS

| Temp. (°C.) | HIP Cycle Time (min) | Pressure (1000 psi) | Shrinkage (ppm) in C2 Cycle | |
|---|---|---|---|---|
| | | | 600° C./ 10 hours | 600° C./ 20 hours |
| 600 | 60 | 12 | −45 | |
| 600 | 100 | 15 | −8 | −184 |
| 620 | 100 | 12 | 16 | −40 |
| 620 | 140 | 15 | 110 | 133 |
| 620 | 200 | 15 | 149 | 118 |
| 650 | 100 | 7 | 8 | −37 |
| 650 | 100 | 9 | 46 | 0 |
| 650 | 360 | 15 | 207 | 256 |

Referring again to FIG. 2, the curve C samples display a distinctly different behavior than the curve B samples. The curve C samples were overhipped, that is, they had a fictive temperature less than the 650° C. temperature at which precompaction was carried out. The glass also apparently had a fictive temperature below 600° C. This is evident by the fact that, when heat treated at 600° C. for times periods up to about 20 hours, the glass undergoes expansion, the expansion generally increasing as the hold time increases. However, for hold times in excess of 20 hours at this temperature, the glass undergoes no further expansion. This suggests that, for Code 1737 glass precompacted under the curve C hipping schedule, even though the glass was overhipped, the glass structure relaxed and reached thermal equilibrium for 600° C. (and thus has achieved a fictive temperature of 600° C.) after a heat treatment of about 20 hours at 600° C.

Figure 3:
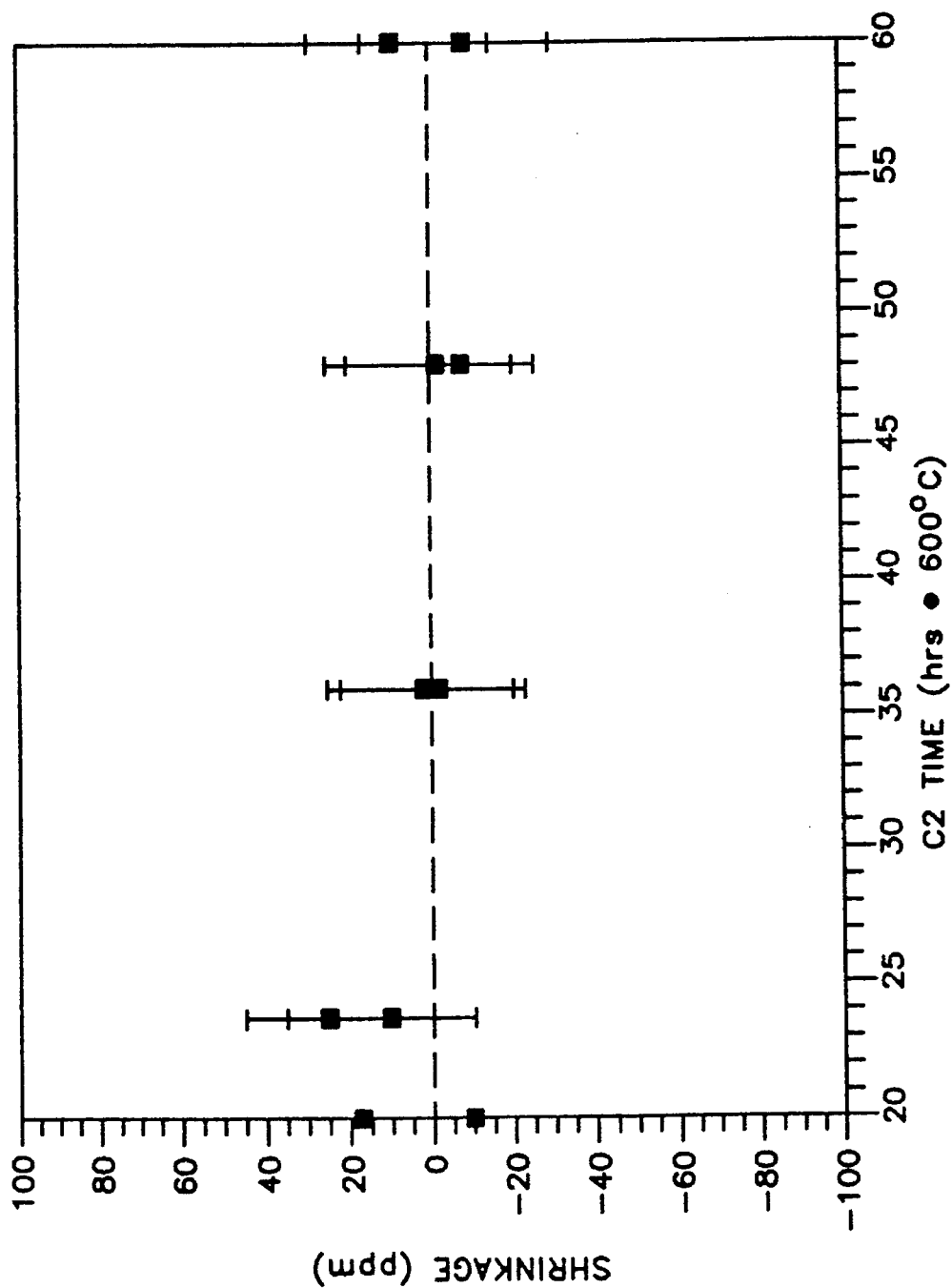
FIG. 3 is a graph of shrinkage measured after a subsequent heat treatment at 600° C. for 12 hours.

One valuable attribute of this discovery is that, even if the glass is overhipped, it can be further processed using secondary heat treatments. This is extremely beneficial, as such secondary heat treatments can be accomplished using the heat provided by the poly-Si display manufacturing operation. For example, as mentioned above, the secondary heat treatment step necessary to convert the amorphous silicon to polysilicon typically involves exposing the glass sheet to about 600° C. for 20 hours or more. Consequently, Code 1737 glass could be precompacted according to schedule C, then immediately coated with amorphous silicon. The 20 hours at 600° C. necessary to convert the amorphous silicon to poly-Si would then further adjust the fictive temperature of the glass, so that the glass would not be further substantially affected by subsequent heat treatments at 600° C. This is exemplified by the data plotted in FIG. 3, which plots shrinkage (ppm) measured after a third heat treatment at 600° C. for 12 hours as a function of secondary heat treatment cycle time (for the primary or initial heat treatment, the glass was again hipped at 650° C., 15000 psi pressure held for 360 minutes). Within the error of the measurement, the glass undergoes no shrinkage in this third thermal cycle as long as the secondary heat treatment cycle time was at least 20 hours.

In summary, we have developed a quick, low temperature method of precompacting high strain LCD substrate glass to enable their use in poly-Si based TFT devices. The method consists of precompacting the glass in a hot isostatic press. The HIP conditions may be chosen to either provide zero compaction under a subsequent thermal cycle; or may be used to erase the previous thermal history of the glass, allowing a second thermal cycle to equilibrate the glass at the temperature of interest.

In the preferred embodiment of the invention, Corning Code 1737 glass sheets are subjected to about 680° C. (corresponding to a viscosity of about $6.1 \times 10^{13}$ poises), at a pressure between 5000 and 15000 psi, to precompact the glass for subsequent poly-Si processing. The preferred pressure for precompacting 1737 at this temperature is about 7000 psi. To achieve this temperature and pressure in the hipping unit, pressure inside the hipping vessel is quickly ramped up to about 4500 psi (at this point the temperature in the vessel is generally below about 100° C.). The pressure is then ramped up at about 17.5 psi/min. to the hold temperature. The temperature is also increased, at a rate of about 5.6° C./min., until the hold temperature of 680° C. is reached. The glass is then held, preferably at about 7000 psi and 680° C., for about 3 hours. The glass sheets are then cooled at a rate of between 1°–5° C., more preferably 2°–3° C., and most preferably at about 2.8° C. per minute to about 450° C., at which point the pressure is vented from the hipping unit.

When Code 1737 treated in this manner is employed in a subsequent processing temperature of 600° C., the glass expands, resulting in a total expansion, at the end of a 24 hour period, of about 70 ppm. However, further heat treatment for a period of 12 hours results in a shrinkage of about 2 ppm, indicating that the glass is very close, after this time period, to equilibrium for 600° C. Consequently, glass hipped under such heat cycling parameters would be quite useful as a poly-Si substrate in a process which sees 600° C. for 36 hours prior to patterning of the gate metal oxide.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method for precompacting a glass sheet substrate for a flat panel display comprising:

exposing a glass sheet to a temperature which corresponds to a viscosity in the glass sheet between about $10^{12}$ and $10^{17}$ poises, and simultaneously applying greater than atmospheric pressure to precompact the glass sheet, thereby making the glass sheet suitable for use as a flat panel display substrate.

2. The method of claim 1, wherein said exposing step comprises exposing said glass sheet to a temperature corresponding to a viscosity in said glass between about $10^{14}$ to $10^{17}$ poises, and said pressure is at least 500 psi.

3. The method of claim 2, wherein said exposing step comprises exposing said glass sheet to a pressure of at least 5000 psi.

4. The method of claim 2, further comprising cooling said glass sheet to a temperature below the strain point of said glass at a rate of between 1°–5° C. per minute.

5. The method of claim 2, further comprising cooling said glass sheet to a temperature at least 100° C. below the strain point of said glass at a rate of between 1°–5° C. per minute.

6. The method of claim 1, wherein said exposing step comprises holding the glass sheet at said temperature and pressure for a period of at least 30 minutes.

7. A process for making a silicon coated glass substrate for use in a flat panel display, comprising:

exposing a glass sheet to a temperature which corresponds to a viscosity in the glass sheet between about $10^{12}$ and $10^{17}$ poises, and simultaneously applying greater than atmospheric pressure to thereby precompact the glass sheet, and applying an amorphous silicon coating to said glass sheet.

8. The method of claim 7, further comprising annealing said glass sheet at a temperature sufficient to convert the amorphous silicon to polycrystalline silicon, whereby after said annealing step the fictive temperature of said glass sheet is substantially the same as said temperature sufficient to convert.

9. The method of claim 7, wherein said exposing step comprises exposing said glass sheet to a temperature corresponding to a viscosity in said glass between about $10^{14}$ to $10^{17}$ poises, and said pressure is at least 500 psi.

10. The method of claim 8, wherein said exposing step comprises exposing said glass sheet to a pressure of at least 5000 psi.

11. The method of claim 8, further comprising cooling said glass sheet to a temperature below the strain point of said glass at a rate of between 1°–5° C. per minute.

12. The method of claim 8, further comprising cooling said glass sheet to a temperature at least 100° C. below the strain point of said glass at a rate of between 1°–5° C. per minute.

13. The method of claim 7, wherein said exposing step comprises holding the glass sheet at said temperature and pressure for a period of at least 30 minutes.

* * * * *